Sept. 29, 1970  C. C. SACHS  3,530,535
LINEAR EXTRUDING APPARATUS
Filed Dec. 16, 1966  2 Sheets-Sheet 1
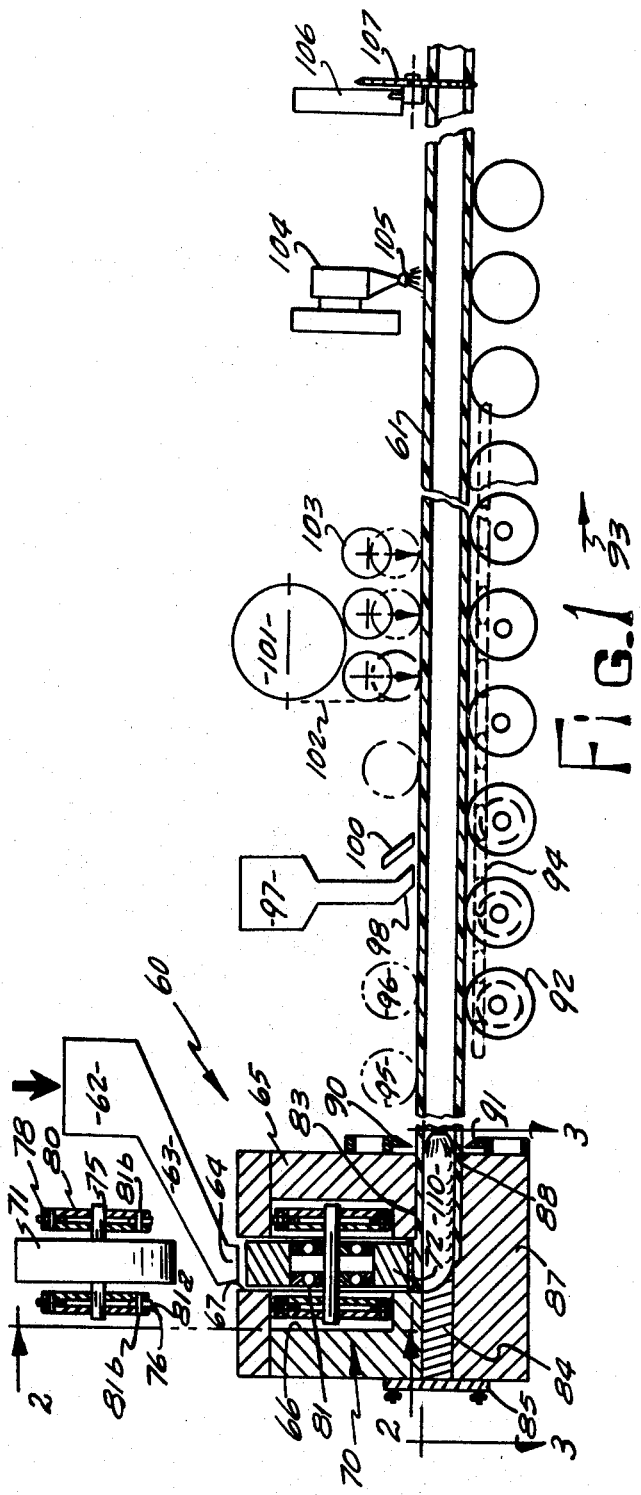
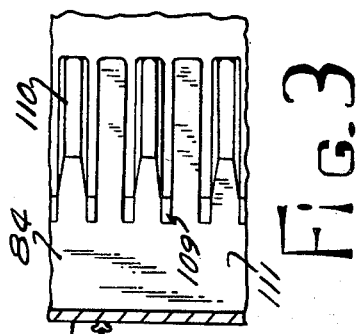
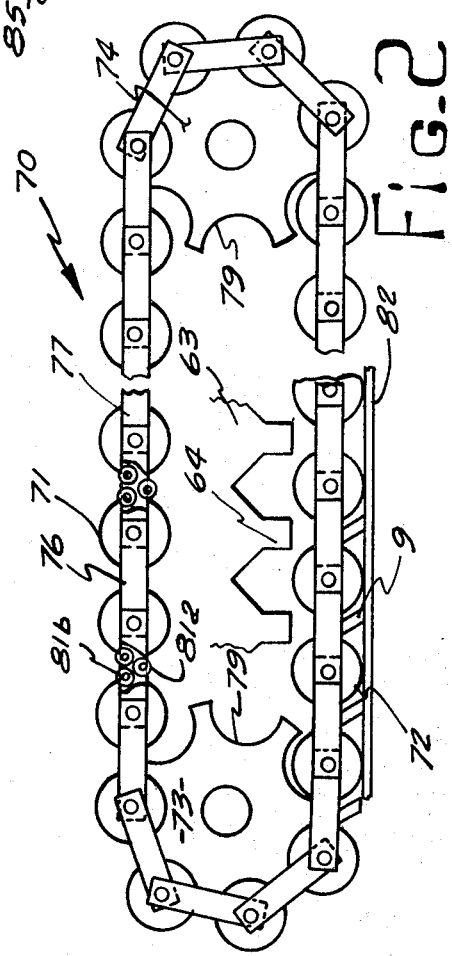
INVENTOR
CARROL C. SACHS
BY
Roger G. Marrs Sept. 29, 1970  C. C. SACHS  3,530,535
LINEAR EXTRUDING APPARATUS
Filed Dec. 16, 1966  2 Sheets-Sheet 2
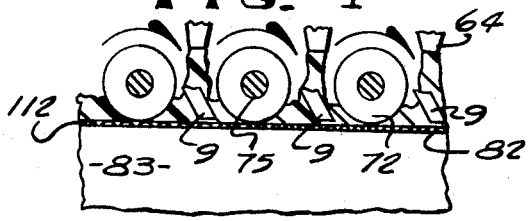
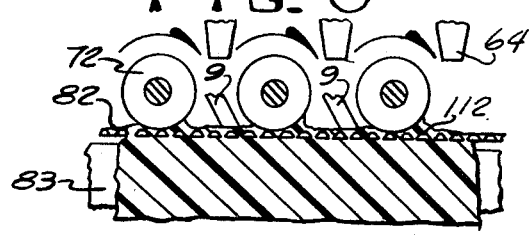
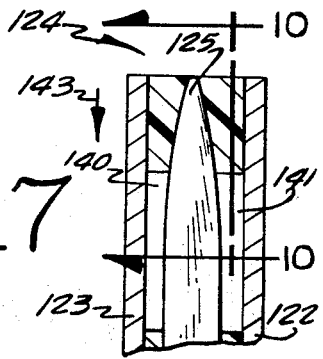
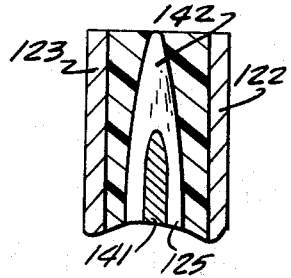
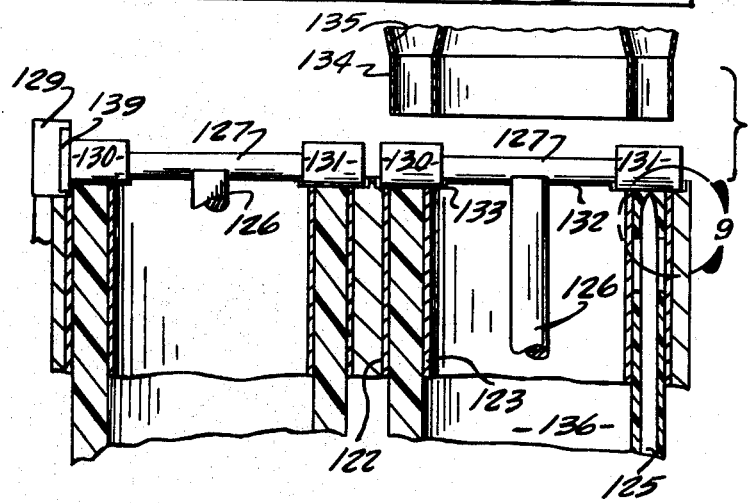
INVENTOR
CARROL C. SACHS
BY
Roger A. Marrs

United States Patent Office

3,530,535
Patented Sept. 29, 1970

3,530,535
LINEAR EXTRUDING APPARATUS
Carrol C. Sachs, Sunland, Calif. 91040
Filed Dec. 16, 1966, Ser. No. 602,274
Int. Cl. B29d 23/04
U.S. Cl. 18—14
12 Claims

ABSTRACT OF THE DISCLOSURE

A linear extrusion machine for the continuous manufacture of a product from plastic raw material is disclosed having an extruder body formed with a material working cavity extending therethrough between a discharge orifice and an inlet orifice adapted to introduce the raw material to the working cavity. A material conditioning means is fixed in the working cavity and separates the cavity into a material collection chamber and a die chamber. Die members are disposed within said die chamber for forming the produce with open cores separated by integral ribs. Roller means are movably mounted on the extruder body to pass through the collection chamber in rolling engagement with the conditioning means and are adapted to forcibly urge the raw material past the conditioning means and the die members to continuously issue the material from said discharge orifice with substantially uniform characteristics whereby the discharged material includes open ended cores assuming the shape and configuration of the die members.

BACKGROUND OF THE INVENTION

Field of the invention

This invention relates to extruding apparatus and, more particularly, to a novel linear extruding method and apparatus for fabricating integrally stiffened structural members of continuous length and height which incorporates desirable core configurations and rib shapes so that load bearing panels and cylindrical structures are derived.

Description of the prior art

Several difficulties and problems have been encountered when employing conventionally fabricated panels and structures which reside in the fact that such prefabrication does not take into account the proper closure of the panel joints and the maintenance of such joints in a sealed condition against adverse climatological conditions. The efficiency resulting from modular construction wherein the building is made of panels of predetermined size and shape depends primarily on the proper securement of the panels in aligned relationship to each other so that the building can both be quickly assembled and when assembled, forms a rigid unitary structure. The accumulation of dimensional tolerances frequently result in misfit leaky joints. To this end, many mechanical systems and hardware items have been devised to effect sealable connection between the adjacent edges of the panels. Obviously, such modular panel and complex joining systems are undesirable from a time, cost and handling point of view.

Prior building panels are presently constructed by conventional methods and to standards which have been in use for many years. Generally, a panel will comprise a pair of spaced apart plywood or Fiberglas sheets that serve as outer facings from the opposite sides of a core which may take the form of cardboard "eggcrating" that may or may not be filled with a plastic filler material such as polyurethane or polystyrene foam. Generally, to construct a single wall for a full scale building, it is required that ten or more conventional panels be employed, some of which are specially configured to provide for windows, doors and other special configurations. Again, for this reason, a tremendous amount of expense and labor goes into the fabrication of the panels and their incorporation into a building structure, whether it be a public building, a factory, a storage structure or a residential unit. Therefore, improvement in the fabrication of structural members which are permitted by modern technological approach and conceptual improvement can readily reduce the cost of such buildings and make them more durable by use of prefabricated panels and related structures which readily accept, position and secure the prefabricated panels to create the building.

SUMMARY OF THE INVENTION

Accordingly, I have found that the novel extruding apparatus and method of the present invention can be employed for fabricating either panels or cylindrical structures in a continuous manner which when cut or severed into a completed unit, will be of an overall length suitable to constitute one complete wall of a building. Thereby, by employing a single panel having a length equal to the overall length of the siding of the building, the need and necessity is completely eliminated for providing securement means as is conventionally used to interconnect a plurality of conventional panels whose overall length when joined would be equal to the length of the building side. After the panel of my invention has been incorporated into the building, suitable windows, doors and the likely may be cut so as to accept the usual window frames and door installations or the cutouts may be hung as doors effecting further economies.

The linear extruding apparatus of the present invention, in general, includes a housing having a receiving chamber for accepting granular plastic materials from the dispensing nozzle of a hopper and in which a plurality of rollers are directed to travel so as to forcibly communicate with the plastic material and to forcibly direct the material through an apertured conditioning plate for introduction to a core lie from which a continucus structural member issues having integrally formed ribs defining a desired core shape or configuration. The apertures are tapered in order to reduce the bulk factor and scrapers are employed adjacent each roller to effect the cleaning thereof and which are effective to position the material in front of each roller. The concept of the present invention includes not only working the plastic material with the rollers moving in a linear path through the housing cavity or chamber but includes the concept of moving the rollers in a circular direction within the chamber. Therefore, a continuous panel is extruded in accordance with the former concept while a cylindrical structural member is extruded in accordance with the latter concept. By practicing the method of the present invention and employing the apparatus, panels or circular members can be produced of any desired length and the process is continuous as long as plastic stock material is supplied to the apparatus.

Inasmuch as the structural members produced from the apparatus of the present invention lend themselves to fabrication from various plastic-like materials, modern forming techniques such as extrusion, are especially suited to manufacture the members. The panel or members are extruded employing the method of the present invention whereby the forcing of filled or unfilled plastic material through a suitably shaped orifice or core die under compressive forces is effected to produce a unitary multi-ribbed structure. The ribbed structure may be severed or cut into individual lengths which form the complete side wall or roof of a building or a complete length of conduit.

Therefore, it is a primary object of the present invention to provide a novel apparatus for producing continuous integrally stiffened panels and cylindrical conduit which are totally composed of plastic-like material having load bearing properties and displaying characteristics of great mechanical strength capable of withstanding shocks and wind loads without breaking or bending.

Another object of the present invention is to provide a novel apparatus for producing at high speed, low cost prefabricated panel and conduit load bearing structures which embody characteristics of a lightweight, high strength-to-weight ratio and that incorporate parallel side facings separated by integrally stiffened ribs having core configurations of desired shape.

Another object of the present invention is to provide an apparatus for producing a prefabricated wall panel so as to aid in the creation of a building which is sturdy and maintenance free, which building panel permits rapid assembly with minimum labor and securement devices.

Still another object of the present invention is to provide a linear extruding apparatus for making a prefabricated building panel which when installed in a building comprises an uninterrupted wall structure for the complete length and width of the building so that a relatively planar exterior and interior surface is provided without irregularities or discontinuities usually encountered with conventional panels.

Still a further object of the present invention is to provide a novel linear extruding apparatus for producing a continuous conduit or cylindrical structure member having integrally formed ribs or stiffeners.

Yet another object of the present invention is to provide a novel linear extruding apparatus which employs a plurality of rollers for forcibly urging a quantity of plastic-like material past a contoured die plate having a specially shaped cross-section for dispensing a continuous structural member such as a panel or cylindrical member. Both types of members may be used as retaining forms for pouring concrete. A quadrant cut from a cylindrical member may be used for a radius corner in conjunction with straight panels.

BRIEF DESCRIPTION OF THE DRAWINGS

Other objects and advantages of the present invention will become more readily apparent from the following detailed description of the unique structure of the apparatus and the novel fabrication method and techniques provided for by the present invention. It should be noted, however, that the following detailed description and the accompanying drawings are merely intended as being illustrative of the invention and not as a limitation thereon. Furthermore, in the following drawings, reference numerals shall be carried forward where applicable to designate like parts of the invention. The invention will be best understood when read in connection with the accompanying drawings, in which:

FIG. 1 is a diagrammatic illustration, partially in section, showing a novel apparatus for fabricating linear extruded panels;

FIG. 2 is a sectional view of the compressing means for forcibly introducing the plastic-like material, to the core dies employed in the apparatus of FIG. 1 as taken in the direction of arrows 2—2 thereof;

FIG. 3 is a sectional view of the core dies incorporated into the apparatus of FIG. 1 as taken in the direction of arrows 3—3 thereof;

FIG. 4 is an enlarged process drawing showing the compression means accepting material supplied from a dispensing nozzle immediately prior to introduction of the material to the core dies;

FIG. 5 is a view similar to that of FIG. 4 illustrating the material being introduced to the core dies after passing through a conditioning plate;

FIG. 6 is a process drawing illustrating the forcible working of the plastic-like material through the apertured conditioning plate;

FIG. 7 is a plan view of another embodiment of the present invention capable of fabricating circular columns or seamless cylindrical conduit incorporating any one of a variety of integrally formed ribs or core configurations;

FIG. 8 is a cross-sectional view of the apparatus of FIG. 7 as taken in the direction of arrows 8—8 thereof;

FIG. 9 is an enlarged sectional view of the core die as taken in the direction of arrows 9—9 of FIG. 8; and FIG. 10 is a cross sectional view of the core die as taken in the direction of arrows 10—10 of FIG. 9.

DESCRIPTION OF THE PREFERRED EMBODIMENTS

Referring now to FIG. 1, one embodiment of a novel linear extruding apparatus incorporating the present invention is illustrated in the general direction of arrow 60 as a means by which a continuous sheet, layer or panel, indicated by numeral 61, may be formed and from which the structural load bearing panel members heretofore described may be fabricated. It is to be understood that the panel formed by the apparatus of the present invention may be composed of any suitable plastic composition such as may be represented by polyesters, epoxies, phenolics, natural resins or any other plastic-like material suitable for impregnating wood fibers or the like which will result in a rigid and load bearing panel. In fabrication, preparation of the bulk feed stock is achieved by compounding and mixing, followed by formation of the panel within the apparatus, then drawing and curing the formed panel, after which surface finishing may take place.

The prepared bulk feed stock is introduced into the extruder 60 by placing the stock in a suitable hopper or chamber 62. The hopper 62 includes a trough 63 formed in its lower end which terminates in a dispensing nozzle 64. The apparatus 60 includes a body or housing 65 having a cavity or chamber 66 formed therein and opening at one end adjacent the dispensing nozzle 64 through an opening 67 formed in a lid or cover 68. By this arrangement, the bulk feed stock may be introduced into the chamber 66 where the material may be worked on by a compression means indicated in the direction of arrow 70.

The compression means 70 comprises an endless loop or chain of rollers, such as rollers 71 and 72 that are continuously driven by means of sprockets 73 and 74 as shown in FIG. 2. Each roller on the chain is rotatably supported on a shaft 75 that not only mounts an individual roller of the plurality but serves as a mounting for linking adjacent rollers to each other via a set of links 76 and 77 located on one side of the roller and links 78 and 80 located on the opposite side of the roller chain. By employing interconnecting shaft links on opposite sides of the roller chain, the linearly extending portion of the chain between the pair of sprockets is maintained substantially rigid and exhibits the characteristic of being a unitary load bearing structural segment of the chain. Each roller, as exemplified by roller 72, is rotatably mounted on its shaft 75 by means of a suitable bearing 81.

Each of the plurality of rollers is adapted to be power driven over an apertured conditioning plate or screen 82 whereby the material introduced into chamber 66 is forced therethrough, as will be described later, into a die chamber 83. As shown, the die chamber is loaded with material formed from strands of stock after being compressed through the apertures in the conditioning plate 82. Within the die chamber 83, there is provided a die block 84. The die block 84 may be readily removed from the die chamber 83 by removing a backup plate 86. By this construction, any one of a number of special die configured blocks may be readily inserted into the die chamber so that a panel may be fabricated by any suitable geometric core configuration. The die block 84 is supported on a base 87. It is to be particularly noted that the die chamber 83 has a dispensing orifice or slot indicated by numeral 88 through which the compressed material exists in the desired configuration. Inasmuch as the die block 84 is configured to produce the desired geometric core configuration, and inasmuch as the die orifice opening 88 is the path of least resistance for the material under pressure, the material will, in effect, flow out of the opening 88 as a continuous panel 61 having the same general cross sectional geometry as the die block 84. By employing the extrusion apparatus of the present invention, the die opening may be as little as ¼ inch and widths up to 40 feet or more may be attained. The stock material emerges from the die in the form of a hot sheet which must be cooled rapidly when thermoplastic materials are used. Employing the present method, wall portion thickness of the panels may vary from ⅛ to ½ inch so that a variety of panel wall portion and rib thicknesses can be produced. Extrusion pressures and speed may vary considerably depending upon the size and shape of the core geometry and the mechanical properties of the material composition. It is also to be understood that thermo-setting plastics may be employed to produce the panels as well as thermoplasts, in which case the extruded panel is heated to promote curing as opposed to subjecting the sheet to cooling as when thermoplastic composition is employed. Furthermore, any desired color may be employed depending upon the type and kind of plastic and filler material utilized.

It will be noted that the entrance to the die chamber 83 from which the material is introduced from the chamber 66 is related normal to the dispensing slot or opening 88 so that the flow of material is dispensed via the opening 88. By employing the extrusion method described above, the continuous panel 61 is produced from which individual panels of substantial lengths may be cut or severed therefrom by means of converging cutters 90 and 91 so that a relatively inexpensive unitary panel can be fabricated.

Once the panel 61 has been forced from the extruder 60, the lower wall portion of the panel is directed over a plurality of transportation rollers, such as roller 92 which serve to support and move the panel in the direction of arrow 93. The plurality of rollers 92 are preferably power driven and are interconnected by means of a conventional chain drive 94 so that all of the rollers are simultaneously driven in the same direction.

As the extruded panel travels over the rollers 92, the upper exposed surface of the panel may be subjected to any one or combination of a variety of surface finishing procedures. Preferably, a pair of idler rollers 95 and 96 engage the uppermost exposed surface of the panel 61 to assure that the leading edge of the extruded panel is directed onto the transportation rollers 92. In some instances, it is desired to apply a coating of gypsum onto the exposed surface of the panel and a hopper 97 is provided for holding a quantity of gypsum which may be suitably fed via nozzle 98 to the surface of the panel lying beneath the nozzle. A leveler 100 is employed for distributing the dispensed gypsum so that the surface of the panel is completely covered. In other instances, it may be preferred to place a layer of paper over the panel and in such an instance, a paper roll 101 is employed for supplying a sheet 102 of the paper to the surface of the panel. The paper may be of the gummed or ungummed type. A plurality of pressure rollers, such as roller 103 is employed for pressing the paper against the surface of the panel. In instances where the paper is ungummed, it is preferred that some form of adhesive, glue or gypsum be provided in the tank 97 which is placed on the surface of the panel prior to the application of the ungummed backing paper. In still other instances, it may be desirable to apply a coating of paint onto the panel surface and therefore, a conventional paint spray apparatus 104 is employed having a paint spray nozzle 105 facing in the direction of the panel surface. To cut a resurfaced panel to length, a cutter device 106 is employed having a conventional saw 107 which is adapted to cut across the panel transversely to sever or retrim a finished panel from the continuous panel being extruded.

Referring now to FIG. 2, it can be seen that the compressive means 70 forms an endless loop of rollers represented by rollers 71 and 72 which are moved by sprockets 73 and 74. The sprockets are driven by any suitable power means and each sprocket includes a plurality of semi-circular pockets 79 that open about the periphery of each sprocket so as to accommodate the seating of the individual rollers in the plurality as the loop moves about the sprocket. The sprockets 73 and 74 are arranged in fixed spaced apart relationship so as to maintain the linear extending portion or segment of the chain loop in a taut condition. The tautness of the linear extending portion or segments of the loop are adapted to provide sufficient compressive force on the material to force the material through the apertured conditioning plate 82. Several shovels 9 are employed between rollers to fluff the material and present a uniform bite to the rollers at the nip as well as to scrape the rollers clean.

Referring now to FIG. 3, another view of the die plate or block 84 is shown wherein it can be seen that the block includes a plurality of die members 110 that project outwardly from a main body 111 in fixed spaced apart relationship. The marginal area of the body 111 adjacent to the root of each die member is downwardly tapered at numeral 109 between adjacent die members to guide and direct the flow of material through the die. The terminating end of each die member 110 is selectively configured to a desired shape which will correspond to and define the core shape of the completed panel. By this same means, the rib shapes and overall geometry of the core and stiffening rib will be determined.

In FIGS. 4–6 inclusive, the flow of pelletized material in chamber 66 issuing from the dispensing nozzle 64 and being forcibly urged through the conditioning plate 82 is illustrated. In detail, the material supplied from nozzle 64 ultimately comes to rest on the top of conditioning plate 82 and is drawn beneath the circular periphery of each roller 72 in the chain of rollers. As the chain moves about its sprockets, material will be captured beneath each of the rollers and the upper surface of the conditioning plate so that as the rollers continue, the material is forcibly urged through the apertures, such as aperture 112, formed throughout the thickness of the conditioning plate. This procedure greatly reduces the bulk factor required to be handled in the die chamber. In FIG. 5, the material is illustrated as having been forcibly urged through the apertures 112 into the die chamber 83 located immediately beneath the conditioning plate 82. A feature of the invention resides in the fact that any residue material remaining on the top surface of the conditioning plate will be forcibly engaged by the plurality of rollers and will be urged through the apertures by the imparting force of the moving rollers so that substantially all of the material deposited within the chamber 66 will be moved into the die chamber 83. With respect to FIG. 6, the rollers and conditioning plate are greatly exaggerated to more clearly illustrate the forcible engagement of the circular periphery of the rollers 72 with the material so that the material is forced through the conditioning apertures 112. FIG. 6a illustrates the material commencing to flow through the apertures while FIG. 6b illustrates the bulk of the material having been forced through the apertures as the roller 72 progresses and FIG. 6a illustrates the material as having been completely forced through the apertures of the conditioning plate.

In operation, the bulk material is deposited within the hopper 62 and is fed to the opening 67 of the extrusion apparatus via the trough 63 and dispensing nozzle 64. As the material enters the chamber 66, the material will be engaged by the plurality of rollers 72 as the chain is rotated about the sprockets 73 and 74. As the material collects in the roller part of the chamber on top of conditioning plate 82, the peripheral surfaces of each roller will forcibly urge the collected material in the nip through the apertures 112 into the die chamber 83. The raw material is reduced in bulk factor, compacted and plasticized by frictional heat and pressure. As additional material is forced through the conditioning plate, the material behind will force the material ahead of it through the die chamber past the die block 84 about the cantilevered die members 110. As the continued action of the rollers urges more material into the die chamber, the formed panel 61 will issue from the opening 88 in the form of a structural panel having a core configuration.

Referring now to FIG. 7, another embodiment of the present invention is shown wherein a novel extrusion apparatus is provided for fabricating a continuous cylindrical structural member such as a conduit, column, tube or the like. However, closed non-circular forms are also contemplated by the present invention such as oval, elliptical, square, etc. The novel extrusion apparatus is indicated in the general direction of arrow 120 and includes a body 121 having a pair of concentric sleeves, the extreme tops of which constitute a pair of tracks 122 and 123 separated by an annular die chamber 124. Suitably secured within the die chamber, as will be described later, there is provided a plurality of die members 125 that are arranged in fixed spaced apart relationship in a coaxial circle within the annular chamber 124.

Disposed on the major axis of the apparatus, there is provided a rotatable shaft 126 having a crossbar 127 fixedly secured on the terminating extremity of the shaft so as to be rotated thereby. The opposite ends of the member 127 are provided with rollers 130 and 131 that are directed to ride on the tracks 122 and 123 when the shaft 126 is rotated. It is to be understood that the means for rotating shaft 126 as well as its mounting in the apparatus may be achieved by any suitable means. However, it is to be understood that shaft 126 is fixed so that rollers 130 and 131 are maintained in forcible engagement with the respective tracks. A scraper plow or shovel 119 is provided for fluffing the material and for feeding the material to the nip of rollers on top of the die opening.

For non-circular shapes, the rollers can be made oversized in width or other means can be employed such as a cam for servo-positioning the scraper plow 119 to place the raw material precisely over the die cavity. The rollers could be servo-positioned on their rotating shafts to properly deliver forming forces on the material to produce the odd shape.

In FIG. 8, it can be seen that the apparatus may include a top lid or cover 132 that may be formed with inwardly projecting channels 133 having sufficient width to accommodate the width of the rollers 130 and 131. The end of the sleeves defining tracks 122 and 123 may terminate between the sidewalls of the channel 133. However, it is to be understood that the tracks 122 and 123 are load bearing members against which the rollers forcibly roll. The apparatus 120 is located in close proximity to an annular dispensing nozzle 134 communicating with a trough 135 leading to a hopper (not shown) for receiving the bulk stock material. The annular dispensing nozzle 134 is coaxially disposed with respect to the die chamber 124 so that the material issuing from the dispensing nozzle will be directly introduced to the die chamber. As illustrated, the material issues from the apparatus after flowing through the die chamber past the die members to form a cylindrical structural member represented by the numeral 136.

As illustrated, the extrusion apparatus 120 includes a second annular die chamber 137 and a plurality of die members 138 that are arranged in a similar fashion to the extrusion device immediately described above. However, it is to be noted that the cross-sectional shape of each die member 138 is trapezoidal in configuration rather than circular as represented by die members 125. Therefore, it can be seen that any one of a variety of shaped die members may be employed to obtain a desired rib and core configuration.

Referring now to FIGS. 9 and 10, the die chamber 124 and die member 125 are illustrated in enlarged diagrammatic form wherein the die members 125 may be held in position within the die chamber by means of securement or mounting brackets 140 and 141. Preferably, the extreme terminating end 142 of each die member is tapered so as to reduce the bulk factor of the material as it flows in the direction of arrow 143.

To form the cylindrical structural member 136, material is introduced into the die chamber 124 from the annular dispensing nozzle 134. As the material gathers within the chamber, the rollers 130 and 131 are rotated by shaft 126 on the circular tracks 122 and 123 through the channel 133. This action brings the circular peripheral surfaces of the rollers into intimate contact with the material within the die chamber to forcibly urge the material through the chamber past the die members 125. The material is forcibly compacted within the chamber not only by the action of the rollers, but by means of the tapered end of the die members which cause the material to compact between the outer periphery of each die member and the inner walls of the sleeves defining the die chamber.

In view of the foregoing, it can be seen that the method and apparatus of the present invention is ideally suited for producing structural panels and cylindrical structural members which are capable for application in a variety of uses requiring load bearing capability. Furthermore, the structural members and panels produced by the present invention may be employed for such applications as partitions, refrigerator enclosures, freight car enclosures, trailers, etc. Each structural member is reinforced thoughout by the provision of integrally stiffened ribs, and by varying the core configuration, a variety of load bearing applications can be had. By fabricating the panel in a continuous manner, panels of structural members of extremely long length and height can be processed so that a single panel may serve as a unitary wall for the complete side of a building, without the cost, distracting appearance and sealing problems concurrent with a multiplicity of joints as with modular panel assemblies. By properly selecting the materials to be introduced to the extruder, the resultant panel may be as rigid as desired and need not be affected by extremes of temperature. Also, great tensile strength can be had which is capable of withstanding shocks without breaking or bending. Once the panel has been fabricated, it can be accurately machined, sawed, sanded, drilled and routed with normal hand tools. The panel or cylindrical member can be colored, painted or resurfaced with any desirable finishing material such as sheet metal, gypsum, paper, etc.

For building construction, doors may be cut from panels, fitted with edgewise trim and rehung in the same opening, or doors may be interchanged where two different colors are involved. Window openings may be machined out at the factory or on the job site and fitted with prehung window frame assemblies.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In a linear extrusion machine for the continuous manufacture of a product from plastic raw material, the combination comprising:
   an extruder body having a material working cavity extending therethrough between a discharge orifice and an inlet orifice adapted to introduce the raw material to said working cavity;
   material conditioning means fixed in said working cavity and separating said cavity into a material collection chamber and a die chamber;

die members disposed within said die chamber for forming the product with open cores separated by integral ribs; and roller means movably mounted on said extruder body to pass through said collection chamber in rolling engagement with said conditioning means and adapted to forcibly urge the raw material past said conditioning means and said die members to continuously issue the material from said discharge orifice with substantially uniform characteristics whereby the discharged material includes open ended cores assuming the shape and configuration of said die members.

2. The invention as defined in claim 1 wherein
the periphery of said roller means cooperates with the surface of said conditioning means to define a nip therebetween adapted to receive the raw material preparatory to its being urged through said conditioning means.

3. The invention as defined in claim 2 wherein
said conditioning means comprises an apertured plate having a top surface against which said roller means forcibly rides in a linear path.

4. The invention as defined in claim 3 wherein
said roller means comprises a plurality of rollers interconnected by linkage means arranged to provide an endless roller chain; and means for powering said roller chain so that the material is forced through said apertured plate so as to reduce the bulk factor of the material.

5. The invention as defined in claim 4 wherein
said extruder body includes a pair of opposing channels opening into said collection chamber for slidably receiving and guiding said linkage means.

6. The invention as defined in claim 5 including
a plow disposed ahead of each of said rollers and adapted to fluff the material and feed the material to said roller nip.

7. The invention as defined in claim 6 wherein
each of said die members is configured to a predetermined geometric shape so that the resultant integrally formed ribs are characterized by structural integrity and integrally stiffened to effect a load bearing product having a high strength-to-weight ratio.

8. The invention as defined in claim 7 wherein
said discharge orifice is disposed substantially normal to said inlet orifice so that the flow of material therebetween takes a right angular excursion under the force of said roller means.

9. The invention as defined in claim 1 wherein
said extruder body working cavity is annular and said roller means is adapted to rotate in alignment with said annular cavity to produce a closed cylindrical product.

10. In a linear extrusion machine for continuously fabricating a structural load bearing product of high strength-to-weight ratio from plastic raw material, the combination comprising:

an extruder body having an annular die chamber extending therethrough between a discharge orifice and an inlet orifice adapted to receive the raw material and introduce the material to said die chamber;

die members disposed in said die chamber and arranged in fixed spaced relationship so as to define passageways for accommodating the flow of material about said die members;

roller means adapted to roll in a circular path on said extruder body over said inlet orifice for forcibly to issue the material through said die chamber so as to issue the cylindrical product having open cores configured to correspond to the shape of said die members; and a power driven shaft means operably coupled to said roller means for driving said roller means in said circular path.

11. The invention as defined in claim 10 including
means carried on said extruder body for feeding the material to a nip defined by the engagement of said roller means with said inlet orifice.

12. The invention as defined in claim 11 wherein
said roller means includes a roller mounted on the opposite ends of a cross-arm fixedly secured at its midsection to said shaft means.

References Cited

UNITED STATES PATENTS

| | | | |
|---|---|---|---|
| 964,550 | 7/1910 | Dupont | 18—12 |
| 1,561,612 | 11/1925 | Loichot | 25—11 |
| 2,205,328 | 6/1940 | Wills | 18—12 XR |
| 2,290,752 | 7/1942 | Hurxthal et al. | 18—12 |
| 2,448,214 | 8/1948 | Gardner | 25—11 XR |
| 2,520,337 | 8/1950 | Roberts | 18—12 |
| 2,717,420 | 9/1955 | Roy | 18—12 |
| 2,767,437 | 10/1956 | Marshall | 18—12 XR |
| 2,958,900 | 11/1960 | Mealsin | 18—12 |
| 3,167,813 | 2/1965 | Keefe | 18—12 |

J. SPENCER OVERHOLSER, Primary Examiner

M. O. SUTTON, Assistant Examiner